T. C. SUZZI.
NUT CRACKING MACHINE.
APPLICATION FILED APR. 4, 1910.
1,060,648.
Patented May 6, 1913.
9 SHEETS—SHEET 3.
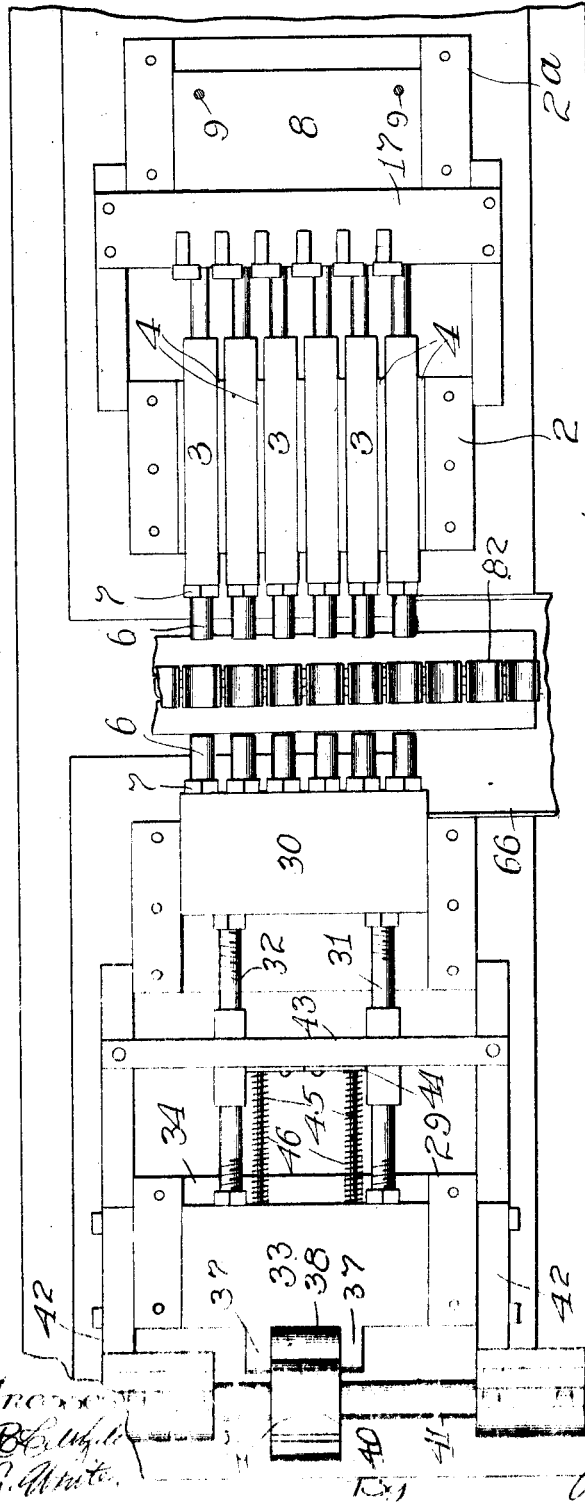
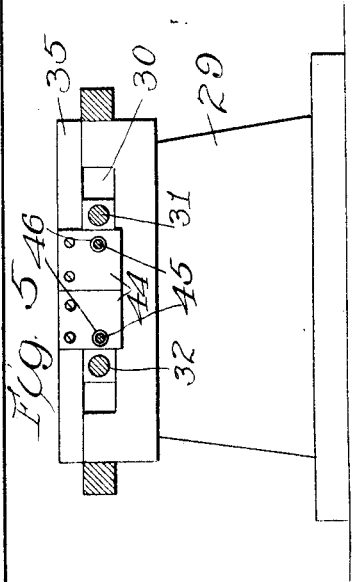

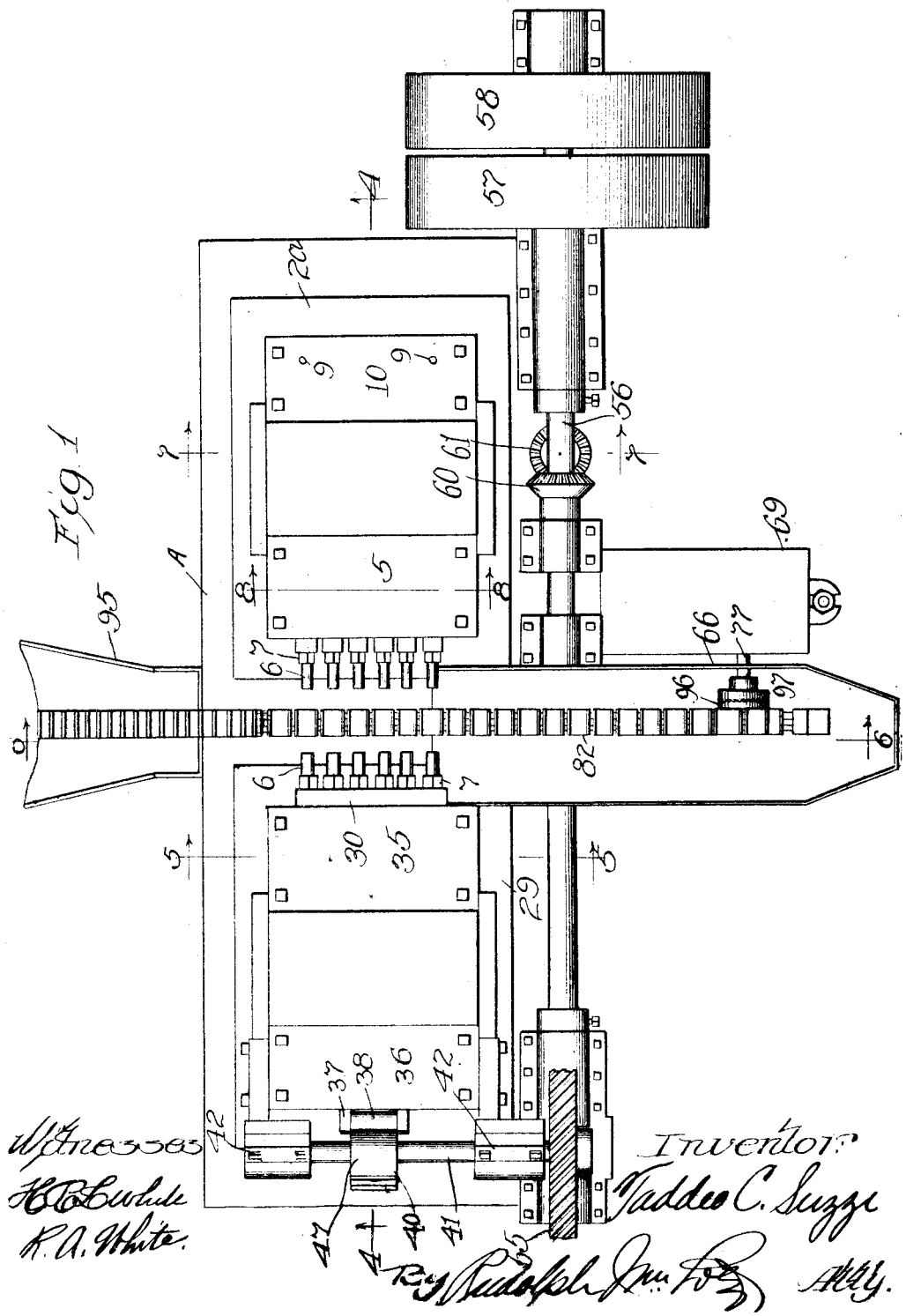

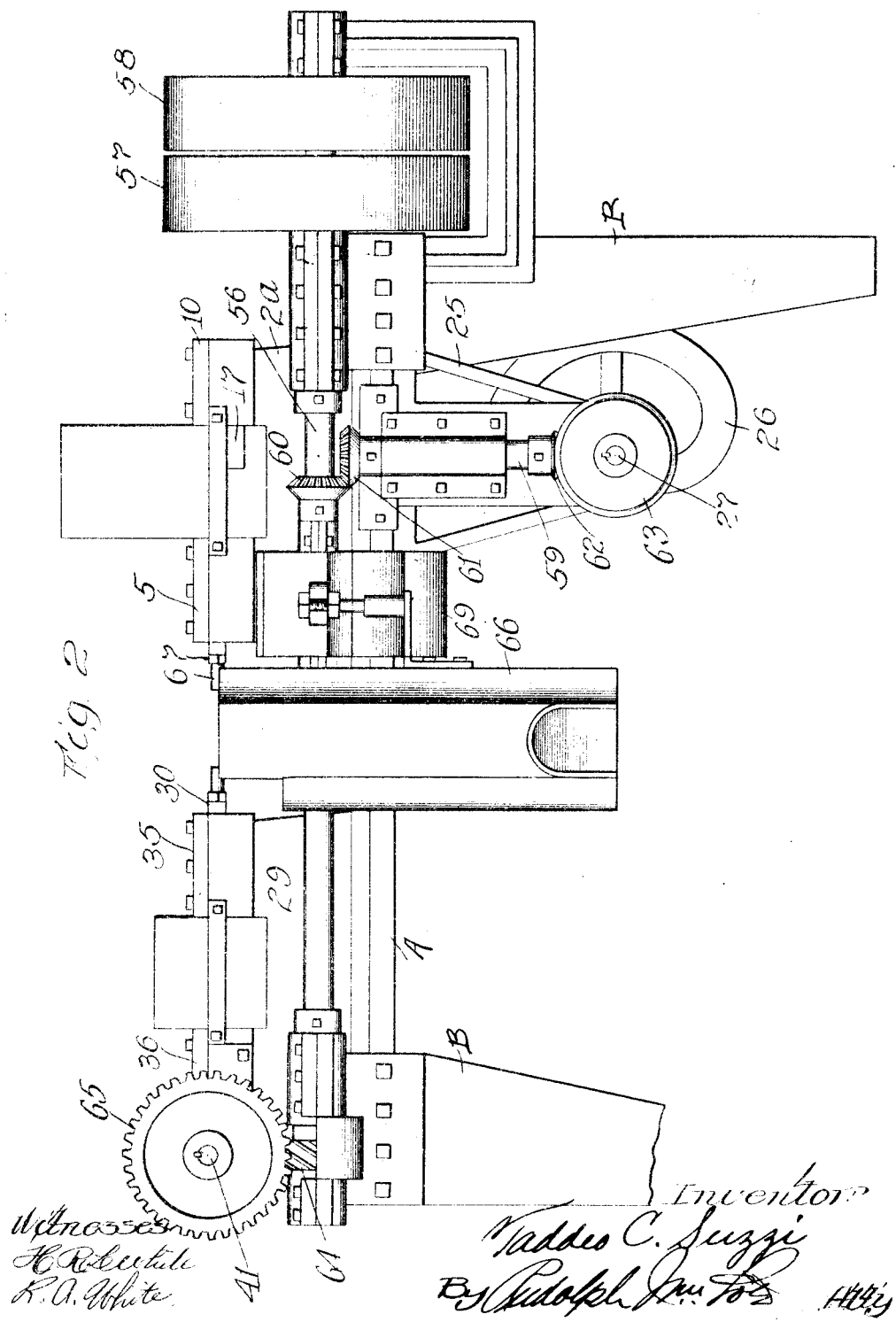

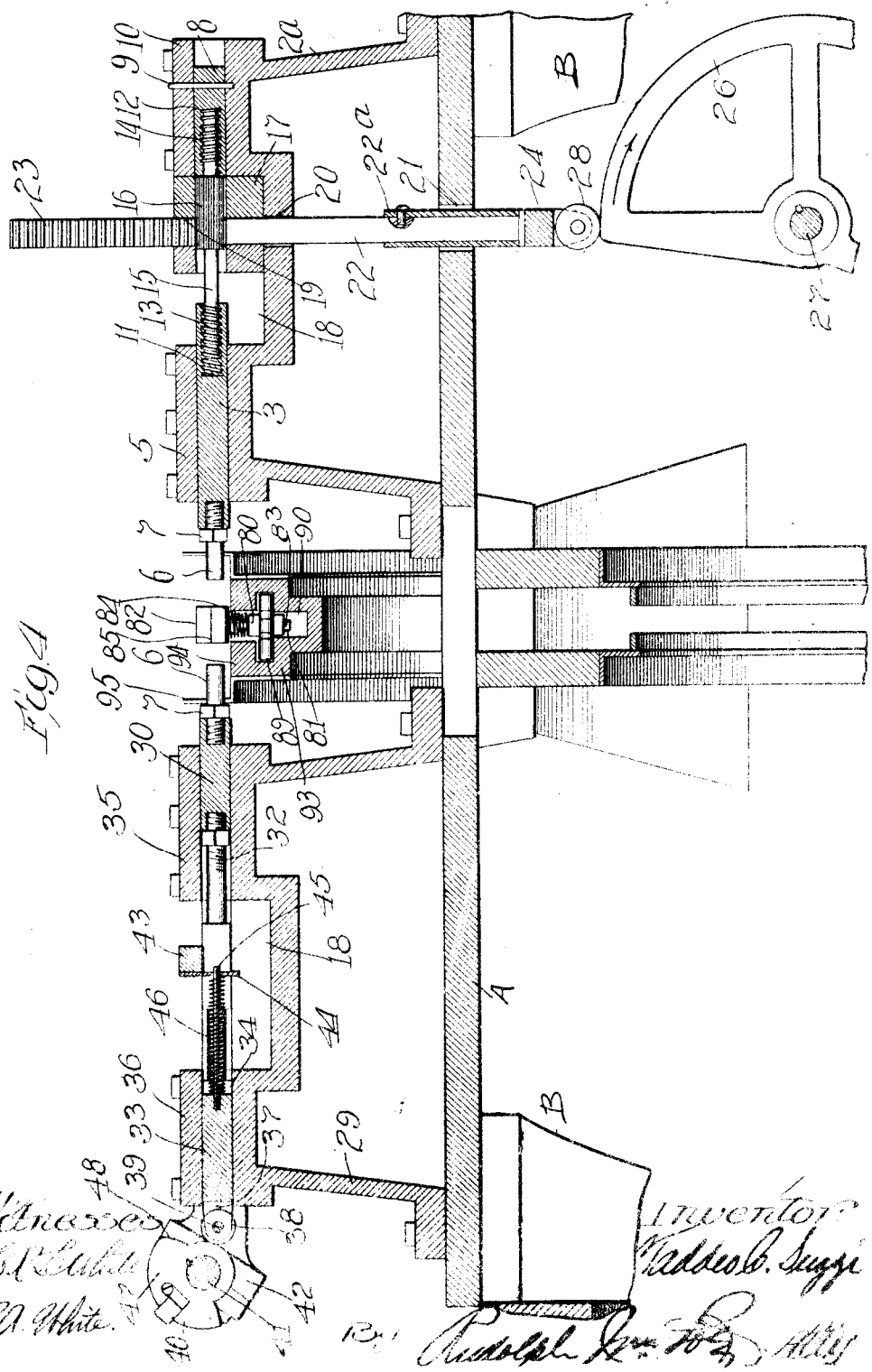

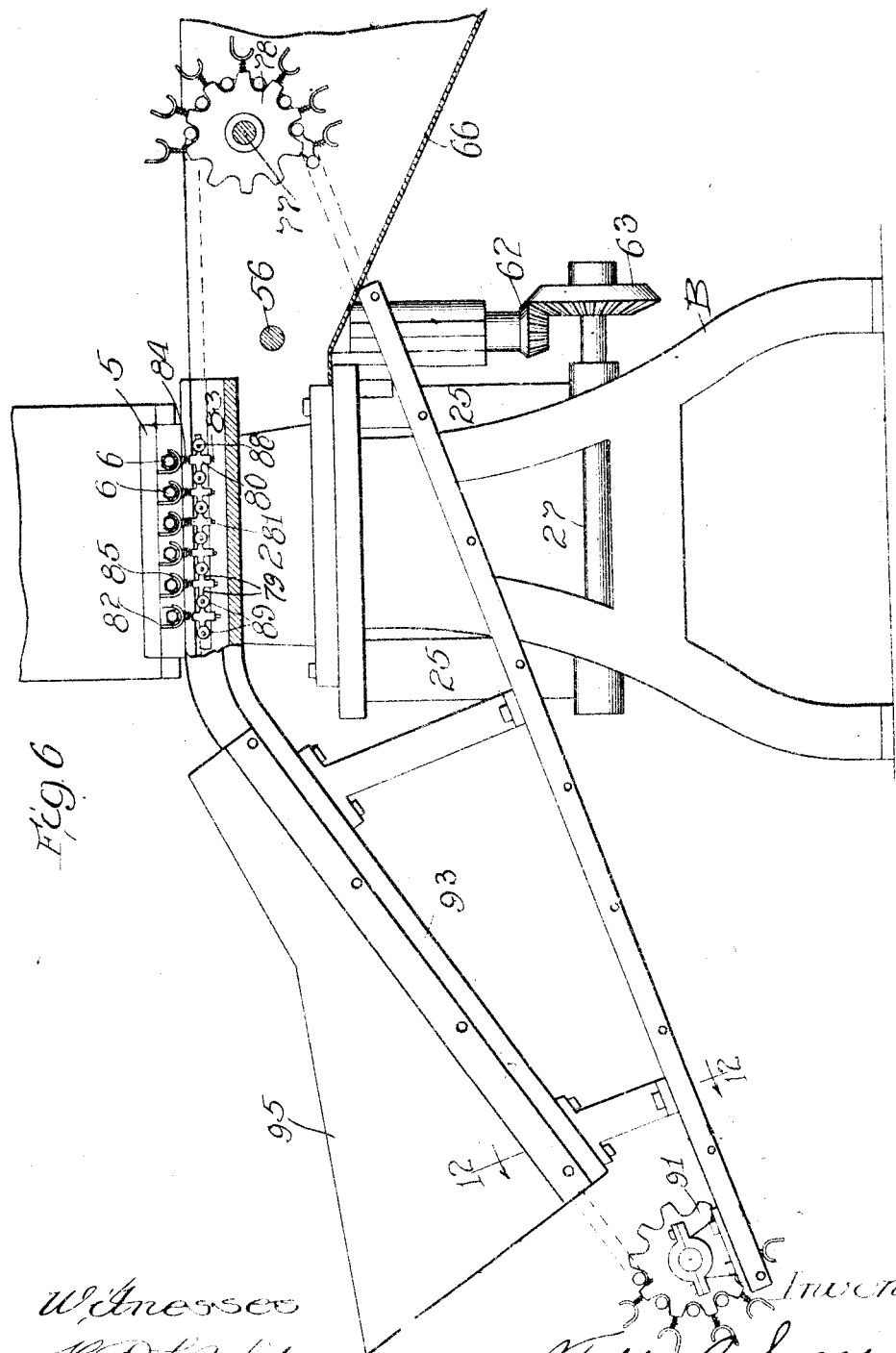

T. C. SUZZI.
NUT CRACKING MACHINE.
APPLICATION FILED APR. 4, 1910.
1,060,648.
Patented May 6, 1913.
9 SHEETS—SHEET 6.
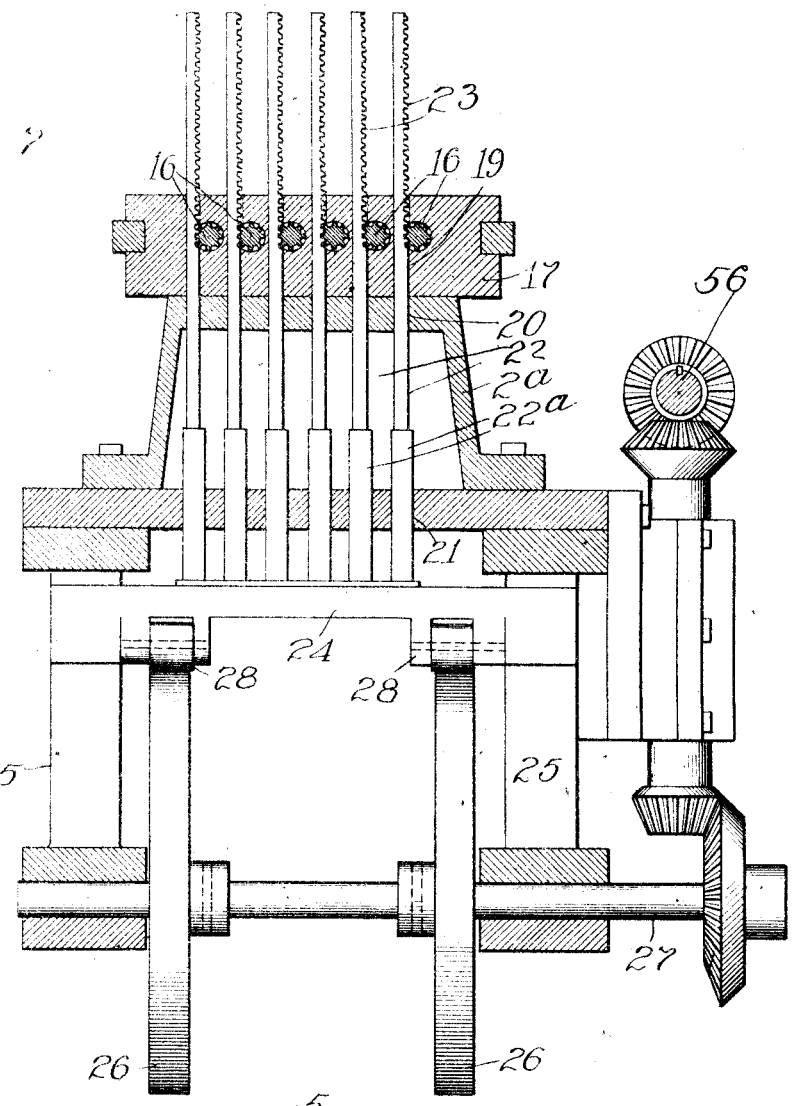
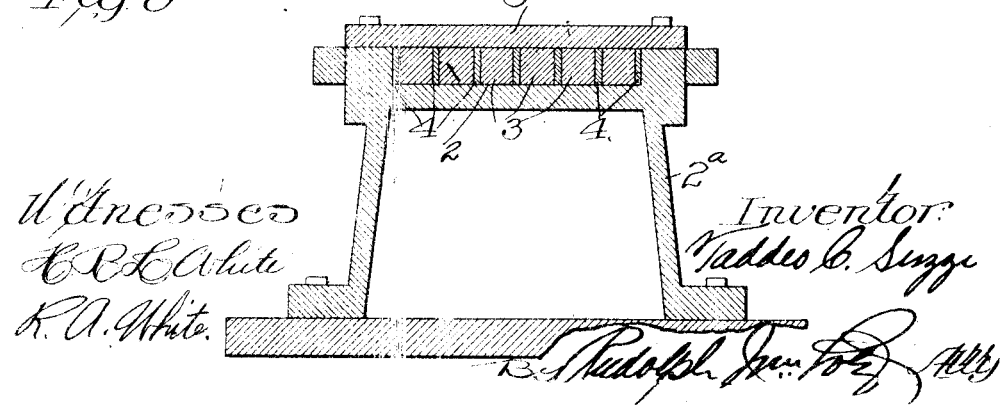

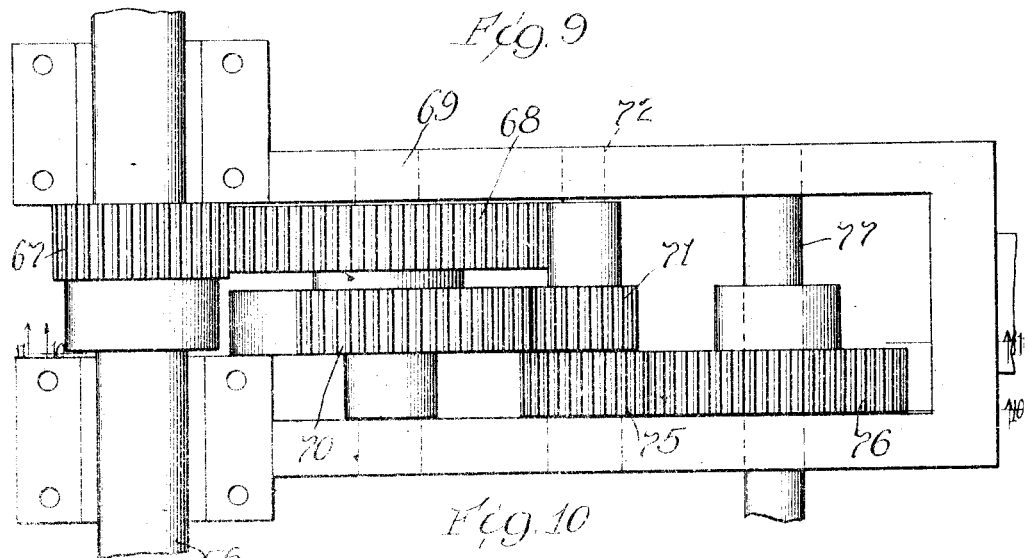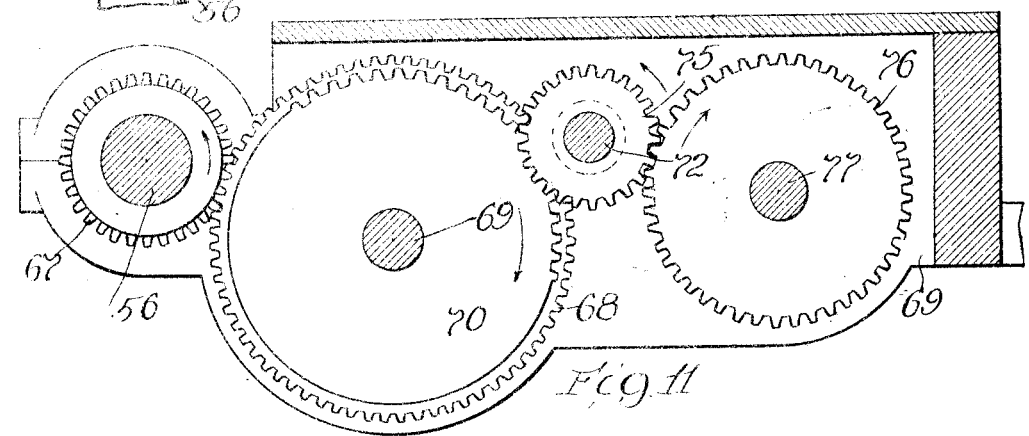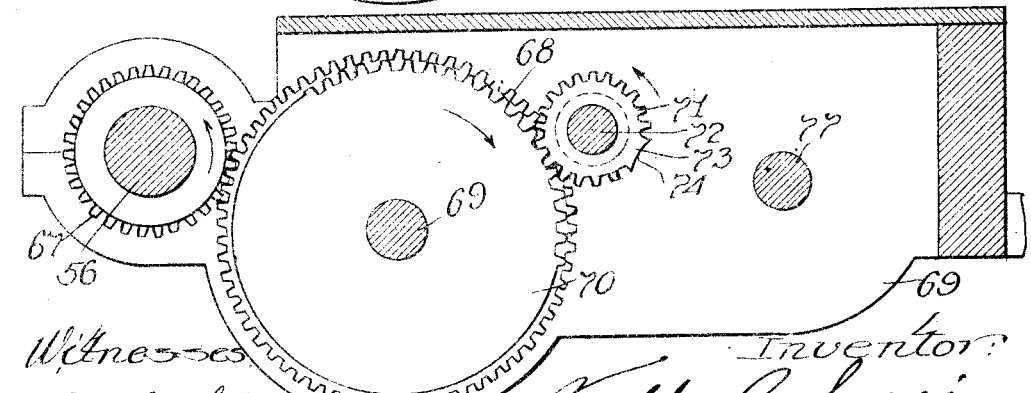

T. C. SUZZI.
NUT CRACKING MACHINE.
APPLICATION FILED APR. 4, 1910.
1,060,648.
Patented May 6, 1913.
9 SHEETS—SHEET 8.
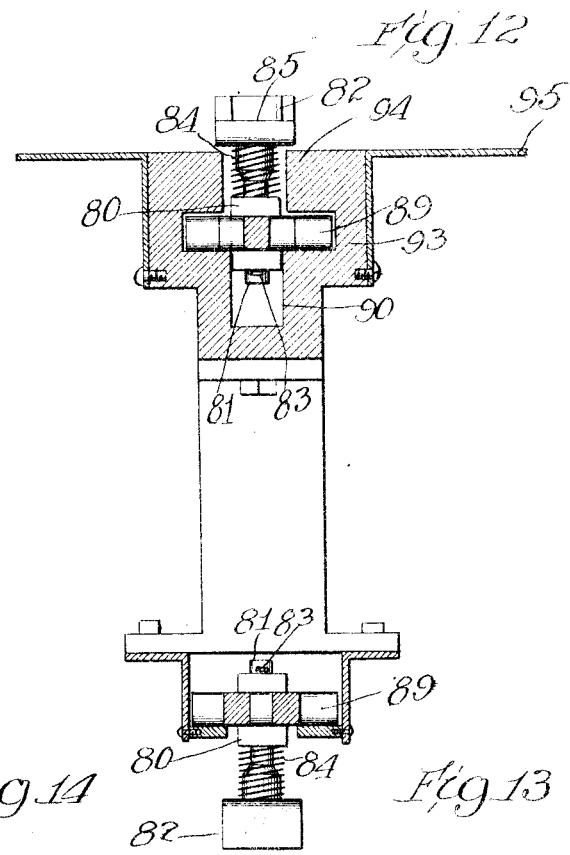
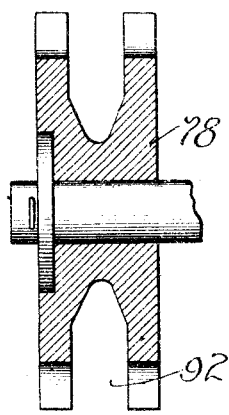
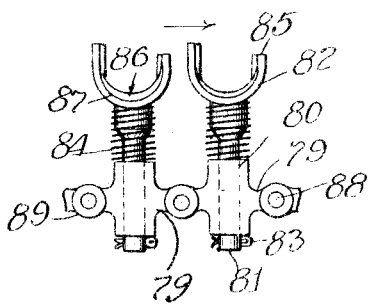
Witnesses
Inventor

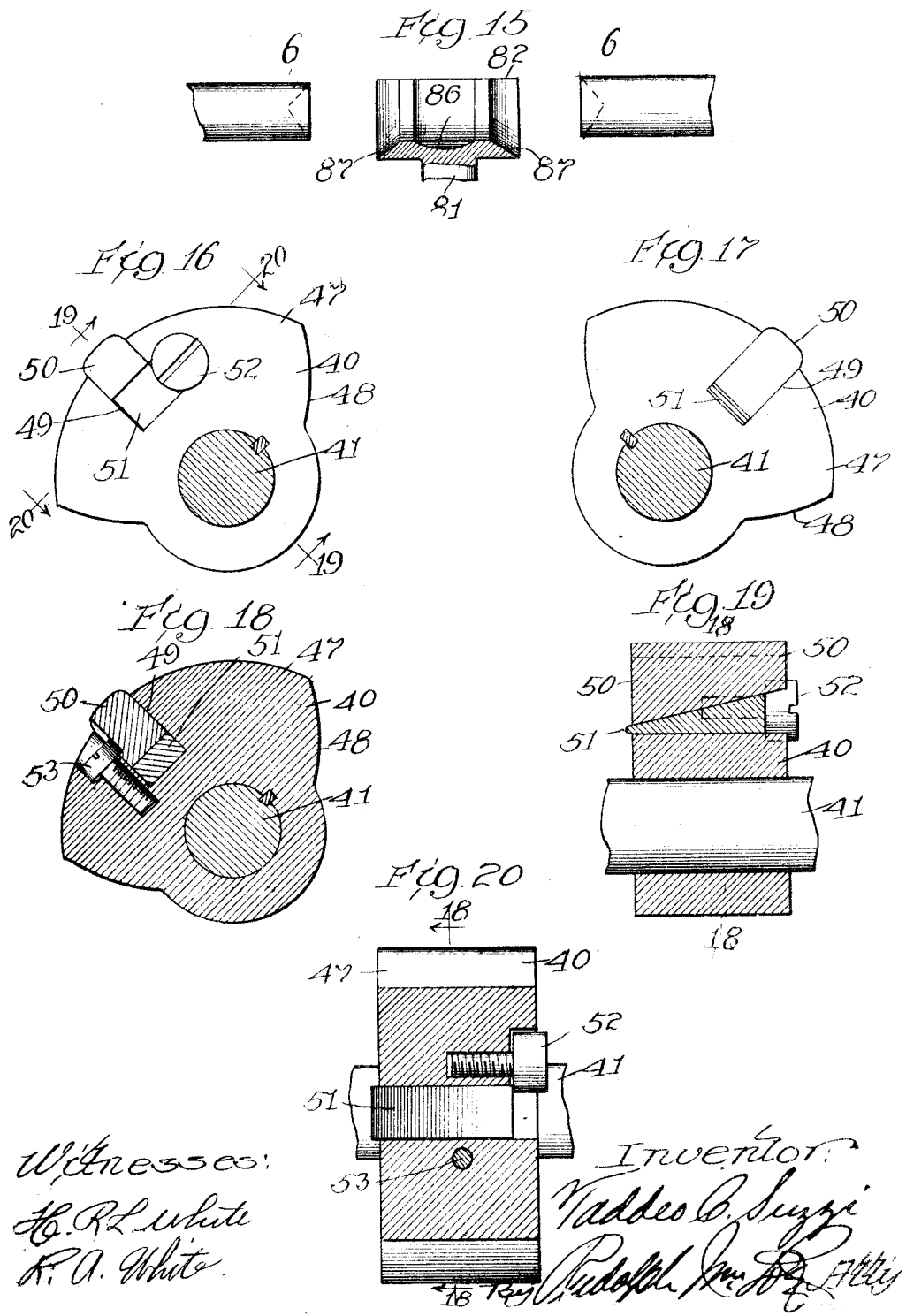

UNITED STATES PATENT OFFICE.

TADDEO C. SUZZI, OF CHICAGO, ILLINOIS, ASSIGNOR, BY MESNE ASSIGNMENTS, TO UNITED FIG & DATE CO., A COPARTNERSHIP CONSISTING OF PETER COSTA, LOUIS GINOCCHIO, AND ANTON M. MEYER, OF CHICAGO, ILLINOIS.

NUT-CRACKING MACHINE.

1,060,648.      Specification of Letters Patent.      Patented May 6, 1913.

Application filed April 4, 1910. Serial No. 553,836.

*To all whom it may concern:*

Be it known that I, TADDEO C. SUZZI, citizen of the United States, residing at Chicago, in the county of Cook and State of Illinois, have invented certain new and useful Improvements in Nut-Cracking Machines; and I do hereby declare the following to be a full, clear, and exact description of the invention, such as will enable others skilled in the art to which it appertains to make and use the same.

This invention relates to improvements in nut cracking machines and has for its object to provide a machine of this character which is simple, durable, efficient and rapidly operable.

The invention consists in the features of construction and combinations of parts hereinafter fully described and claimed.

In the accompanying drawings illustrating this invention: Figure —1— is a top plan view of a nut cracking machine constructed in accordance with my invention. Fig. —2— is a front elevation of the same. Fig. —3— is a plan view of the same with said plates and hoods removed to expose to view the internal mechanism. Fig. —4— is a central vertical longitudinal section of the machine taken on the line 4—4 of Fig. —1—. Fig. —5— is a detail vertical transverse section on the line 5—5 of Fig. —1—. Fig. —6— is a central vertical transverse section on the line 6—6 of Fig. —1—. Fig. —7— is a vertical transverse section on the line 7—7 of Fig. —1—. Fig. —8— is a similar section on the line 8—8 of Fig. —1—. Fig. —9— is a plan view on an enlarged scale showing the gearing employed for actuating the nut carrying mechanism, the top of the gear casing being removed to expose said gearing to view. Fig. —10— is a vertical sectional view on the line 10—10 of Fig. —9—. Fig. —11— is a vertical section on the line 11—11 of Fig. —9—. Fig. —12— is a detail vertical sectional view on the line 12—12 of Fig. —6—. Fig. —13— is a fragmentary detail view in side elevation of the links of the carrier employed. Fig. —14— is a detail central vertical section through one of the sprockets over which the carrier chain is trained. Fig. —15— is a fragmentary detail enlarged vertical longitudinal section showing the relative positions of the plungers and nut carrier pockets. Fig. —16— is a detail view in side elevation of an adjustable cam employed, the shaft thereof being shown in section. Fig. —17— is a similar view of the opposite side of the same. Fig. —18— is a sectional view of the same on the line 18—18 of Fig. —20—. Fig. —19— is a sectional view of the same on the line 19—19 of Fig. —16—. Fig. —20— is a detail sectional view of the same on the line 20—20 of Fig. —16—.

The present machine is particularly adapted and designed for cracking pecan nuts although it may be employed for other purposes or modified as required to suit it to the cracking of nuts of any other character without departing from the spirit of the invention.

The general shape of a pecan nut is too well-known to require description, but for the purpose of making clear the advantages of my present invention I desire to call attention to the fact that pecan nuts vary greatly in length and likewise in diameter or circumference and that these variations are frequently disproportioned in different nuts. That is to say, pecan nuts are sometimes of relatively great length in proportion to diameter and at other times of relatively great diameter in proportion to length. They vary also in size, that is to say, they are graded according to size, the longer well-proportioned nuts constituting a higher grade than the shorter and smaller kinds. Aside from the variations in size referred to, the shells of nuts coming from different districts vary in thickness, those having the heaviest shells being known as "hard-shell" and those having thinner shells being known as "soft-shell". These nuts are cracked by pressure exerted upon the ends thereof and such pressure serves to fracture the entire shell in multitudinous directions, the same being almost as brittle as glass but the extent to which the ends of the nuts must be forced toward each other in order to effect fracture of the shell, and without transmitting such pressure to the kernel to the injury of the latter, must be varied somewhat in accordance with variations in length of the nuts, and the variations in thickness of the shells, that is to say, the longer the nuts and the harder the shell the longer may be the stroke of the cracking plungers whereby the ends of the shell are forced toward each other. Hence, in cracking pecan nuts of the highest grades and hardest-shelled, the cracking stroke of the plungers must be longer proportionately than in cracking the lower grade shorter and thinner shell nuts. It is furthermore essential that a machine of this character should work rapidly in order that its economy may be materially realized but at the same time the rapidity of its operation should not interfere with the efficient manner of the performance of its function.

In the construction and manner of operation of my present machine I make use of an old and well-known idea in the art which has been previously successfully carried out to a moderate extent, that is to say, the nuts are carried into the path of relatively widely separated cracking plungers which move forward into engagement with the nut, the latter acting as a stop to limit this primary movement of said plungers and determining the same. The plungers having been primarily brought into such engagement with the nut are subsequently given an added movement toward each other thus imparting a crushing pressure to the shell of the nut and serving to fracture the same. The primary movement, as will be seen, is indeterminate as it must necessarily vary in accordance with variations in length of interposed nuts but the secondary or crushing movement is fixed and determined. It will be obvious that the plungers employed must possess the strength and rigidity necessary to perform the requisite function and to impart such strength and rigidity a considerable weight is necessary. Rapidity of operation necessitates rapid primary movement of the plungers toward each other and into engagement with the nut, the latter serving to bring the same to a sudden stop. Accordingly, the weight of the plungers and the means employed for moving the same into engagement with the nut must not impart sufficient force to fracture the shell as, if this occurs, the secondary movement imparted will obviously serve to not only further fracture the shell but to crush and thus detract from the value of the kernel.

My present invention relates more particularly to the specific mechanism employed for imparting primary movement to the plungers into engagement with the nuts so as to firmly engage the same without, however, at this time fracturing them, and consists further in the particular means employed for imparting the secondary or crushing movement to said plungers and to the particular means for varying such secondary movement in accordance with the grade of nuts to be cracked.

The invention consists still further in the means employed for automatically feeding the nuts into cracking relation to the plungers and delivering the cracked nuts from the same, and in such other details and particulars as will hereinafter appear.

The machine comprises a suitable frame consisting substantially of a table A supported upon the legs B. On one end portion of the table there is mounted a supporting member 2ª which carries a plate 2 provided with a recess in which a plurality of parallel plungers 3 are reciprocally movable, said plungers being separated from each other and from the end walls of the recess by means of plates 4 of brass or other suitable anti-friction metal interposed between the same and suitably held in place in said recess. A cap plate 5 is adapted to cover said plate 2 and be secured to the same and serves to prevent said plungers 3 from leaving the bearings formed between the bottom of the recess in said plate 2 and said top plate 5 in connection with the said plates or strips 4 of anti-friction metal. Said plungers 3 are square in cross section and each is equipped at one end with a cylindrical extension 6 preferably threaded therein and held securely in place thereon by means of lock nuts 7 or the like. Said extensions 6 are preferably made of a harder metal than the plungers 3 and are provided in their outer ends with conical recesses in which the ends of nuts to be cracked are adapted to be received.

Mounted on the table rearwardly of the plate 2 is a block 8 held against movement relatively to said table by means of a pin or pins 9 passing through the same into openings in the table top and passing also through openings in a cap plate 10 covering the same. In the rear ends of the plungers 3 are threaded openings 11 and in said block 8 in axial alinement with said plungers 3 are similar threaded openings 12, the threads in said block and plungers being respectively right and left and adapted to receive the respectively right and left threaded end portions 13 and 14 of shafts 15 each of which is equipped between its ends with a relatively long spur pinion 16. In said cap plate 10 and in a block 17 disposed below the same and resting in the bottom of a supporting pocket 18 in the supporting member 1 for said plungers and the mechanism for actuating the same, as well as in the bottom wall of said pocket and the table top, are slots 19, 20 and 21 respectively, through which plungers 22 pass and in which they are guided. Each of the said plungers is equipped at its upper end portion with a rack 23 meshing with the said pinions 16 and are adapted in reciprocating to turn said shafts 15 thereby imparting longitudinal movement to said plungers 3. Each of the said plungers 22 is adapted to move by gravity in one direction and in the other direction is raised by means of a bar 24 extending transversely of the table and mounted at its ends in vertical guides 25 (more particularly shown in Fig. —7—) and which are controlled by means of cams 26 on a shaft 27 geared, as hereinafter described, to the drive shaft of the machine. A strip of fiber covers said bar 24 to protect the same from the blows of said racks, the latter being equipped at their lower end portions with interchangeable tubular weights 22ᵃ as shown in Fig. —4—. Each of said cams 26 has a spiral face extending through an arc of substantially 230 degrees from the hub to a radius somewhat in excess of the maximum stroke requisite to said plungers 22 to perform the function required thereof. The said cam surface terminates relatively abruptly at its point of greatest radius and is adapted during revolutions to engage antifriction rollers 28 carried by said bar 24 thereby raising the latter at intervals and permitting the same, after the said point of greatest radius of the cam surface has passed the same, to drop relatively suddenly to the lower limit of its movement, such drop being, however, somewhat retarded by the straight rear edges of the cams 26, said rear edges instead of being radial, forming part of a chord and extending tangential to the hub. The plungers 22 are thus deprived of their support and will obviously drop by gravity thereby imparting rotary movement to the shafts 15 and, as will be obvious, imparting longitudinal movement to said plungers 3. The said table top carries at its other end portion a similar supporting member 29 provided in the end portion nearest adjacent the end portion of the first-named supporting member 24 with a recess disposed in alinement with the recess in which said first-named plungers 3 are disposed and in which a plunger 30 is reciprocally movable, the latter being provided at the end opposing the plungers 3 with similar heads or extensions 6 similarly mounted therein. The said plunger 30 is connected by means of two rods 31 and 32 with a plate or plunger 33 disposed in a guide recess 34 in the rear end portion of the said supporting member 29, both said guide recesses for said plungers 30 and 33 being covered by cap plates 35 and 36 respectively, which serve to hold the said plungers in place. Said plunger 33 is provided on its rear edge with a pair of parallel lugs 37 between which an anti-friction roller 38 is received, the latter being revolubly mounted on a pin 39 passing through said projections. The said anti-friction roller is adapted to be engaged by a cam 40 carried by a shaft 41 extending transversely of the machine at one end thereof and which is journaled adjacent its ends in bearings 42 suitably supported on the frame; the said shaft 41 being also suitably geared to the drive shaft of the machine as will be hereinafter more fully described. Spanning the pocket 18 of said supporting member 29 and extending transversely to the direction of movement of the plungers 30 and 33 is a bar 43 which is equipped between its ends with a downwardly projecting plate or flange 44 provided with two openings for the passage of plungers 45, the latter being secured in the forward end of the plunger 33 in any suitable manner. Helical compression springs 46 are disposed upon said plungers 45 and are interposed between the forward end of the plunger 33 and the rear face of said plate or flange 44 and serve to maintain said plungers 30 and 33 normally at the rearward limit of their movement.

The cam 40 consists of a hub having a cylindrical surface concentric with its axis of rotation and extending through an arc of substantially 210 degrees and is provided on the remaining portion of its circumference with a segmental projection 47 terminating at one end in an inclined face 48 upon which the said anti-friction roller 38 is adapted to travel from said cylindrical face of the hub to the outermost face of said projection 47. This movement of the said roller 38 obviously involves forward movement of the plungers 30 and 33 a distance equal to the difference in radii between the said cylindrical portion of the hub of said cam and of the said segmental projection 47 thereof. In the face of said segmental projection there is, as is shown in Figs. 16 and 17, a recess 49 in which is mounted a block 50 of metal having rounded edges and projecting therefrom. The lower face of said projection 50 is inclined and rests upon the inclined face of a wedge 51 resting upon the bottom of said recess, said wedge being adapted to be moved longitudinally in order to vary the projection of said block from the face of said segmental projection 47. Movement of the said wedge is effected by means of a set screw 52 mounted in a threaded opening in the side of the cam and having its head projecting from the recess in which it is contained. At its inner end said head engages a shoulder on said wedge and is adapted to move the same in the direction of insertion of said screw to raise and increase the projection of said block 50 from said recess. A similar screw 53 mounted in a radial opening in the face of the projection 47 engages said block 50 and holds the latter firmly down upon the wedge and likewise prevents longitudinal movement of said block in said recess.

It will be obvious from the foregoing description that each of the plungers 3 is movable independently of the other and that all of them may be moved simultaneously to respectively different positions while the heads 6 of the plunger 30 are all moved simultaneously a predetermined distance. The forward movement of the plunger 30 is not determined by any agent other than said cam 40 while the movement of each of the plungers 3 is determined by the resistance offered thereto and the power of the plungers 22 to overcome such resistance. The movement of said plungers 22 by gravity is necessarily relatively rapid but the transformation of the reciprocating movement thereof into the rotary movement of the shafts 15 and this in turn into reciprocating movement of said plungers 3 at right angles to the direction of movement of said plungers 22 causes said plungers 3 to move relatively gently although rapidly forward and to prevent said plungers when thus moved forward to exert a fracturing force upon the nut to be engaged between the same and the head 6 of the plunger 30.

Before proceeding with the description of the nut carrying means I desire to direct attention to the gearing employed for actuating the various parts of the mechanism. The drive shaft 56 of the machine extends longitudinally of the frame and carries a fast pulley 57 and a loose pulley 58 over which a belt is trained to gear said shaft with a source of power. A vertical shaft 59 transmits motion from the shaft 56 to the shaft 27 on which the cams 26 are mounted through the medium of the bevel pinions 60, 61 and 62, the latter meshing with the bevel gear 63 on said shaft 27. Adjacent the other end of the machine said shaft carries a worm 64 having substantially a 45 degree pitch and which meshes with a worm wheel 65 on the shaft 41 thus rotating the latter. The said shaft 56 passes through the gear-case 66 suitably supported upon the frame of the machine and within said case carries the spur pinion 67 meshing with a spur gear 68, the latter being rigid on a counter-shaft 69. On said shaft 69 is a segmental spur gear 70 having teeth disposed over about one-third of its periphery, the remainder of the latter being smooth and having the radius of the pitch line of said gear. The said gear 70 is adapted to mesh with a spur pinion 71 disposed on a countershaft 72, said pinion 71 being provided on a part of its periphery with a projection 73 taking the place of several teeth and having a concave outer face 74 the radius of which is equal to the pitch line radius of said gear 70 and is adapted to receive the portion of the periphery of the latter devoid of teeth and during the passage thereof said pinion 71 is held against rotation. On said shaft 72 is a spur pinion 75 which meshes with a spur gear 76 on the countershaft 77, the latter carrying one of the sprockets 78 over which the carrier chain is trained. The said carrier chain consists of a plurality of links 79 pivotally secured together at their ends in the usual and well-known manner. Midway between the ends of each of said links 79 is a bearing 80 extending perpendicularly to the axes of the pivotal connections of said links with each other, each of said bearings having a rectangular opening in which the square shank 81 of a pocket 82 for nuts is received. A cotter-pin 83 in the lower end of said shank prevents withdrawal of the latter from said sleeve 80 and the helical compression spring 84 interposed between the other end of said sleeve 80 and said pocket 82 serves to maintain the latter normally at the upper limit of its movement relatively to said sleeve. The said pocket 82 is concavo-convex in cross-section and substantially semi-cylindrical, one edge of the same being equipped with a flange 85 projecting above the other edge of the pocket. Between the ends or side edges of said pockets 82 the latter are provided with concave recesses 86 in which the nuts are adapted to be received, and at either end of said recess 86 and extending to the said side edges of the pockets are beveled faces 87, shown in detail in Fig. —15—.

The springs 84 are relatively weak and maintain the pockets normally at the upper limits of their movement. The pockets are so arranged that when disposed between the plungers the latter are free to enter the same at either end without coming in contact with the beveled ends thereof and thus immediately engage the contained nut. In exerting crushing pressure on the ends of the nut it is obviously necessary that the shell of the latter shall be free to expand between its ends so as to fracture over its entire circumference and for this reason weak springs 84 are used thereby enabling the expansion of the shell to readily depress the pockets against the action thereof.

It sometimes happens that a nut becomes lodged between adjacent pockets and serves to maintain them separated a little more than normally. Where this occurs the plungers in entering the pockets will engage the beveled end walls of the same and by forcing the latter out of their path crush the lodged nut. It will be obvious that in the absence of such beveled end walls the plungers would under these conditions strike the ends of the pocket and thereby obviously cause a break or other damage to the machine.

The pins 88 effecting pivotal connection of the links 79 with each other project beyond the side edges of said links and carry anti-friction rollers 89 on their projecting end portions. The said anti-friction rollers travel on rails 90 disposed on either side of the vertical plane of travel of the chain and serve to support said links against the depressing action of the heads 6 of the plungers. Said chain is trained over said sprocket 78 at one end of the machine and a similar sprocket 91 at the other end thereof. Each of said sprockets is provided with an annular groove 92 in its periphery extending to a sufficient depth to receive the lower end portions of said bearings 80 and shanks 81 while the toothed surfaces bordering said recess 92 engage the said anti-friction rollers 89, the said chain being thus set in motion by the said sprocket 78, the sprocket 91 being idle. The said sprocket 91 is supported at a considerably lower elevation than said sprocket 78, the supporting means consisting of suitable brace rods connected with the frame of the machine. The said rails 90 are angularly extended, as at 93, at a downward incline and receive the anti-friction rollers 89 of the chain after the latter have left the sprocket 91 and begin their upward travel. The said extended portion 93 of said rails 90 is shown in detail in Fig. 12, the same being provided with overhanging flanges 94 between the opposing inner faces of which the upper end portions of the bearings 90 and shanks 81 and springs 84 travel. The upper faces of said flanges 94 constitute the middle portion of the bottom wall of a hopper 95 in which the nuts are received. The rear end of said hopper is closed but the forward end and top of the same is open. As the pockets 82 pass through said hopper nuts drop into the same and are carried thereby into the bearings of the said head 6 of the plungers. Six pairs of the latter are provided and consequently it is essential that at each movement of the chain or carrier six pockets each containing a nut shall be brought into alinement with said plungers. To this end the gearing previously described and contained in the gear case 66 is arranged to intermittently impart movement to said carrier for a length equal to six of the links thereof; the intervals of travel of the chain being timed to alternate with the movements of the plungers.

In order to enable the sprocket 78 to be adjusted on the shaft 77 so as to insure said pockets being brought into axial alinement with the cracking plungers, I provide rigid with said sprocket 78 a clutch member 96 which engages a similar clutch member 97 rigid on the shaft 77, the opposing faces of said clutch members being provided with a large number of ratchet teeth meshing with each other and serving to transmit the movement of said shaft 77 to said sprocket. In the event that the pockets should not travel quite far enough or a little too far relatively to the cracking plungers they may be readily adjusted to be brought into proper position by turning the sprocket the required amount relatively to the shaft either forward or back relatively to the clutch member 97 by first disengaging the same from the latter and after turning it reëngaging it therewith.

The operation of the machine will be so readily understood from the foregoing description as to probably obviate the necessity of detail description of the operation thereof.

I claim as my invention:

1. In a nut cracking machine, mechanism for imparting indeterminate thrust movement to a cracking plunger, comprising a threaded rotatable member having threaded engagement with the plunger at one end and engaging a rigid part of the frame of the machine at its other end, a gear pinion on said plunger between the ends thereof, and a reciprocable rack-bar meshing with said pinion for rotating said threaded member.

2. In a nut cracking machine, the combination with a rigid part of the frame and a reciprocable plunger, of mechanism for imparting indeterminate thrust movement to said plunger in one direction relatively to said frame, comprising a rotatable threaded member having threaded engagement with at least one of said parts, a gear pinion thereon, and a rack-bar meshing with said pinion.

3. In a nut cracking machine, the combination with a rigid part of the frame and a reciprocable plunger, of mechanism for imparting indeterminate thrust movement to said plunger in one direction relatively to said frame, comprising a rotatable threaded member having threaded engagement with at least one of said parts, a gear pinion thereon, a rack-bar meshing with said pinion and adapted to be moved by gravity to rotate said threaded member in one direction, and power actuated means on the frame of the machine for restoring said rack-bar to its normal position after each movement thereof by gravity.

4. In a nut cracking machine, the combination with a rigid part of the frame and a reciprocable plunger, of mechanism for imparting indeterminate thrust movement to said plunger in one direction relatively to said frame, comprising a rotatable member equipped with right and left threads respectively at opposite ends and having threaded engagement with said plunger and said rigid part of said frame, a pinion rigid with said rotatable member, and a rack-bar meshing with said pinion.

5. In a nut cracking machine, the combination with a rigid part of the frame and a reciprocable plunger, of mechanism for imparting indeterminate thrust movement to said plunger in one direction relatively to said frame comprising a rotatable member equipped with right and left threads respectively at opposite ends and having threaded engagement with said plunger and said rigid part of said frame, a pinion rigid with said rotatable member, a rack-bar meshing with said pinion and adapted to be moved by gravity to rotate said threaded member in one direction, and power actuated means on the frame of the machine for restoring said rack-bar to its normal position after each movement thereof by gravity.

6. In a nut cracking machine, mechanism for imparting indeterminate thrust movement to a cracking plunger, comprising a threaded rotatable member having threaded engagement with a plunger at one end and engaging a rigid part of the frame of the machine at its other end, and a gear pinion forming part of the mechanism for imparting said thrust movement to the said plunger, and a reciprocable rack-bar meshing with said pinion for rotating said threaded member.

7. A nut cracking machine comprising in combination, two sets of opposed cracking plungers, nut supporting means interposed between the opposed ends of said plungers, a reciprocating head carrying one of said sets of plungers, a cam actuating the same in one direction and imparting movement thereto in said direction at two distinct intervals, a spring maintaining said head normally at the rearward limit of its movement, a plurality of reciprocating heads carrying the other plungers, a member rigidly disposed on the frame of the machine rearwardly of said heads, there being tapped openings in said member and in the opposing ends of said heads, the threads of said openings being respectively right and left, screw shafts having right and left threaded end portions respectively engaging said member and said heads, spur pinions rigid on said screw shafts between the ends thereof, rack bars meshing with said pinions and actuated in one direction by gravity, and cams actuating said rack bars in the other direction.

8. A nut cracking machine comprising in combination, two sets of opposed cracking plungers, nut supporting means interposed between the opposed ends of said plungers, a reciprocating head carrying one of said sets of plungers, a cam actuating the same in one direction and imparting movement thereto in said direction at two distinct intervals, a spring maintaining said head normally at the rearward limit of its movement, a plurality of reciprocating heads carrying the other plungers, a member rigidly disposed on the frame of the machine rearwardly of said heads, screw shafts interposed between said member and said heads and engaging tapped openings in at least one of the latter respective elements, and means for rotating said screw shafts at intervals alternately in opposite directions for imparting reciprocating movement to said heads.

9. A nut cracking machine comprising in combination, two sets of opposed cracking plungers, nut supporting means interposed between the opposed ends of said plungers, a reciprocating head carrying one of said sets of plungers, a cam actuating the same in one direction and imparting predetermined movement thereto in said direction at two distinct intervals, a spring maintaining said head normally at the rearward limit of its movement, a plurality of reciprocating heads carrying the other plungers, a member rigidly disposed on the frame of the machine rearwardly of said last-named heads, rotatable means interposed between said member and each of said respective heads and operatively engaging both of the latter for imparting relative movement thereto, and means for rotating said means alternately in opposite directions.

10. A nut cracking machine comprising in combination, two sets of opposed cracking plungers, nut supporting means interposed between the opposed ends of said plungers, a reciprocating head carrying one of said sets of plungers, a cam actuating the same in one direction and imparting movement thereto in said direction at two distinct intervals, a spring maintaining said head normally at the rearward limit of its movement, a plurality of reciprocating heads carrying the other plungers, a member rigidly disposed on the frame of the machine rearwardly of said heads, rotatable members interposed between said rigid member and said heads and operatively engaging both of said elements, means actuated by gravity in one direction operatively actuating said respective rotatable members independently of each other for imparting movement to said heads in one direction, and power actuated means actuating said last-named means in the other direction to reverse the movement of said heads.

11. In a nut cracking machine, the combination with a supporting device for nuts, and means for imparting movement thereto at intervals, of opposed sets of cracking plungers disposed on respectively opposite sides of the said supporting devices, a reciprocating head carrying one of said sets of plungers spring actuated in one direction, power actuated means imparting movement thereto in the opposite direction at respectively different intervals, a reciprocating head for and carrying each plunger of the other set, a member rigidly disposed on the frame rearwardly of said last-named heads, rotatable means interposed between each of said heads and said last-named member for imparting reciprocating movement to the latter, and reciprocating means imparting rotary movement to said members inpendently of each other in one direction and simultaneously in the opposite direction.

12. In a nut cracking machine, the combination with a supporting device for nuts, and means for imparting movement thereto at intervals, of opposed sets of cracking plungers disposed on respectively opposite sides of the said supporting devices, a reciprocating head carrying one of said sets of plungers spring actuated in one direction, power actuated means imparting movement thereto in the opposite direction at respectively different intervals, a reciprocating head carrying each plunger of the other set, a member rigidly disposed on the frame, a rotatable threaded member interposed between each of said heads and said rigid member and engaging a tapped opening in at least one of said elements, a spur pinion rigid on each of said threaded members between the ends thereof, rack bars actuated by gravity in one direction meshing with each of said respective spur pinions and adapted to rotate each of said rotatable members independently of the other in one direction and a cam actuated reciprocating member movable in the path of and adapted to engage said rack bars and move the same simultaneously in the opposite direction.

13. In a nut cracking machine, the combination with a supporting device for nuts and means for imparting movement thereto at intervals, of opposed sets of cracking plungers disposed on respectively opposite sides of the said supporting devices, a reciprocating head carrying one of said sets of plungers spring actuated in one direction, power actuated means imparting movement thereto in the opposite direction at respectively different intervals, a reciprocating head carrying each plunger of the other set, a member rigidly disposed on the frame, rotatable members having respectively right and left threaded end portions interposed between each of said heads and said rigid member and engaging respectively right and left tapped openings in said respective last-named elements, and reciprocable means operatively engaging said rotatable members for alternately rotating the same in opposite directions.

14. In a nut cracking machine, the combination with a supporting device for nuts, and means for imparting movement thereto at intervals, of opposed sets of cracking plungers disposed on respectively opposite sides of the said supporting devices, a reciprocating head carrying one of said sets of plungers spring actuated in one direction, power actuated means imparting movement thereto in the opposite direction at respectively different intervals, a reciprocating head carrying each plunger of the other set, a member rigidly disposed on the frame, rotatable members having respectively right and left threaded end portions interposed between each of said heads and said rigid member and engaging respectively right and left tapped openings in said respective last-named elements, a spur pinion rigid with each of said rotatable members, a rack bar for each of said spur pinions actuated by gravity in one direction for rotating the same independently of each other for imparting thrust movement to said heads in one direction, a reciprocable member movable in the path of said rack bars, and means adapted to actuate said reciprocable member to throw the same into engagement with said rack bars to raise the same simultaneously to return all of said heads to the other limit of their movement.

15. In a nut cracking machine, the combination with a supporting device for nuts equipped with pockets, and means for imparting intermittent movement thereto, of nut cracking plungers one disposed at either end of the pockets of said supporting device and adapted to be simultaneously moved to project into the same in engagement with the supported nut, the latter coacting with one of said plungers to form a stop to limit the movement of the other, means for imparting movement to the last-named plunger the distance determined by the other plunger and the interposed nut, and means for moving the last-named plunger at successively different intervals in the same direction a predetermined distance to primarily engage and subsequently crack the nut, said last-named means comprising a cam equipped with surfaces of different radial projection from its axis of rotation, and means for adjusting the radial projection of one of said surfaces.

16. In a nut cracking machine, the combination with a supporting device for nuts and its actuating means, of a pair of cracking plungers one disposed on either side of the said supporting device, one of said plungers being spring actuated in one direction to maintain the same normally at the rearward limit of its movement, rotatable means for imparting movement to said plunger against its spring actuation to move same forward a given distance primarily and subsequently imparting given added movement in the same direction, said means imparting said added movement adjustable relatively to its axis of rotation, a member rigidly disposed on the frame of the machine rearwardly of the other plunger, a rotatable threaded member interposed between the same and said last-named plunger and operatively engaging both said elements for imparting relative movement thereto, gravity actuated means operatively engaging said rotatable member for imparting thrust movement to said plunger for a distance variable in accordance with the size of and determined by the nut to be cracked, and a cam actuated reciprocable member movable in the path of said last-named means and adapted to engage and actuate the same in the other direction for reversing the movement of said last-named plunger.

17. In a nut cracking machine, the combination with a carrier for nuts equipped with spring supported pockets for the latter, said pockets having flaring end portions, of a pair of opposed plungers one disposed on either side of the path of travel of said carrier and adapted when moved toward each other to engage nuts disposed in said pockets, means simultaneously actuating both said plungers to move the same to project into said pockets, the movement of one of said plungers determined by engagement with the nut contained in said pockets, said nut coacting with the other of said plungers to constitute a stop, and means for imparting a secondary movement to the last-named plunger to crack said nut, the said springs supporting the said pockets permitting the latter to yield to the expansion of the shell of the nut in cracking.

18. In a nut cracking machine, the combination with a carrier for nuts, means for imparting intermittent movement thereto, pockets carried thereby, springs supporting said pockets, beveled end walls for said pockets, and opposed cracking plungers disposed on either side of the plane of travel of said pockets, of mechanism for simultaneously actuating said plungers to thrust the same into the ends of said pockets to engage contained nuts, and means adapted to impart further thrust movement to the plungers on one side of said carrier to crack the nuts, said pockets being adapted to be depressed by expansion of the shell of the nut between its ends due to the pressure of the cracking plungers on the ends thereof, said beveled end walls of said pockets adapted to be engaged by said plungers to correct the position of the former relatively thereto against the action of an obstructing nut becoming lodged between contiguous pockets.

19. In a nut cracking machine, the combination with opposed cracking plungers arranged in pairs and adapted to engage and crack interposed nuts, and means actuating said plungers at intervals, of a carrier traveling between said opposed plungers, nut carrying pockets disposed on said carrier at regular intervals and movable relatively thereto, springs engaging said pockets to maintain the same normally in a given position relatively to the carrier, there being concave recesses in the bottom of said pockets, the end walls of the latter being beveled and adapted to be engaged by the entering ends of said opposed plungers to impart movement to said pockets relatively to the carrier to correct their positions relatively to said plungers, a hopper for nuts through which said pockets travel, a driving element common to said plungers and said carrier, and gearing between the latter and said driving element for imparting given movement to the former at intervals alternating with movements of said plungers.

20. In a machine of the kind specified, means for imparting thrust movement to cracking plungers in the same direction at respectively different intervals comprising a rotatable shaft, a cam rigid therewith, a segmental projection on said cam, an auxiliary projection in the face of said segmental projection, and means for adjusting the projection of said auxiliary projection from said segmental projection.

21. In a machine of the kind specified, means for imparting thrust movement to cracking plungers in the same direction at respectively different intervals comprising a rotatable shaft, a cam rigid therewith, a segmental projection on said cam, an auxiliary projection in the face of said segmental projection, the latter movably mounted in a recess in the face of said segmental projection, a wedge in said recess disposed beneath said auxiliary projection and movable longitudinally relatively thereto to vary the projection thereof, and means for holding said auxiliary projection in its adjusted position.

22. In a machine of the kind specified, means for imparting thrust movement to cracking plungers in the same direction at respectively different intervals comprising a rotatable shaft, a cam rigid therewith, a segmental projection on said cam, an auxiliary projection in the face of said segmental projection, the latter movably mounted in a recess in the face of said segmental projection, a wedge in said recess disposed beneath said auxiliary projection and movable longitudinally relatively thereto to vary the projection thereof, means for holding said auxiliary projection in its adjusted position, and means mounted in said cam operatively engaging said wedge to impart movement thereto.

23. In a nut cracking machine, means for imparting thrust movement to cracking plungers at respectively different intervals in the same direction comprising a rotatable shaft, a cam rigid thereon, a segmental projection on the hub of said cam for imparting a primary thrust movement to the cracking plungers, there being a recess in the face of said projection, a cam-member mounted in said recess, a wedge disposed in said recess underneath said cam member, a set screw engaging said wedge for imparting movement thereto in one direction, and a set screw engaging said cam member to hold the same firmly in engagement with said wedge, the latter serving to vary the projection of said cam member from the face of said segmental projection.

In testimony whereof I have signed my name in presence of two subscribing witnesses.

TADDEO C. SUZZI.

Witnesses:
 RUDOLPH WM. LOTZ,
 M. M. BOYLE.